Patented July 19, 1949

2,476,391

UNITED STATES PATENT OFFICE 2,476,391

EXTRACTIVE DISTILLATION OF PROPIONALDEHYDE FROM ACROLEIN

Adin Lee Stautzenberger, Corpus Christi, and Samuel B. Jeffries, Kingsville, Tex., assignors to Celanese Corporation of America, a corporation of Delaware No Drawing. Application August 1, 1947, Serial No. 765,630

4 Claims. (Cl. 202—39.5)

This invention relates to distillation operations and relates more particularly to a novel process for the separation of acrolein from propionaldehyde by an extractive distillation operation.

An object of this invention is the provision of an efficient and economical process for the separation of acrolein from a mixture of acrolein and propionaldehyde by distillation operations.

Another object of this invention is to provide a novel extractive distillation process whereby a mixture of acrolein and propionaldehyde may be separated with the aid of an inert liquid extractant.

Other objects of this invention will appear from the following detailed description.

The separation of acrolein and propionaldehyde by ordinary fractional distillation methods is quite difficult since both compounds boil within a narrow temperature range. Accordingly, a modification of the usual distillation operations employed must be effected in order to obtain a commercially satisfactory separation of the acrolein from the propionaldehyde.

We have now found that acrolein may be separated efficiently and economically from a mixture of acrolein and propionaldehyde by fractionally distilling said mixture under reflux while continuously introducing a neutral, higher boiling solvent for acrolein into the reflux stream. Furfural may be mentioned as an example of a suitable neutral solvent which may be employed. The solvent action exerted by the furfural, which is a liquid under the temperature conditions prevailing, in passing down the column with the reflux, acts to scrub the rising vapors substantially free of acrolein. The distillate obtained under these conditions comprises 95 to 98% by weight of propionaldehyde and contains no more than about from 0.3 to 0.5% of acrolein.

The distillation is preferably effected employing a reflux ratio of 5:1 and feeding 2 parts by volume of furfural into the vapor stream passing up the column preferably just below where the reflux stream enters the column, for each volume of distillate taken off at the head of the column.

In order further to illustrate our invention but without being limited thereto the following example is given:

Example

A mixture containing 92.3% by weight of propionaldehyde and 7.7% by weight of acrolein is brought up to reflux temperature in a suitable fractionating column provided with a reflux line. The distillate coming over is at a temperature of 117° F. After the reflux has been adjusted to a 5:1 ratio, two parts by volume of furfural are added to the column, below the reflux feed inlet, for each volume of distillate removed. The term "distillate" here refers to that portion of the condensate which is removed as purified propionaldehyde. Equilibrium conditions are reached shortly. The purified propionaldehyde removed at the head of the column contains over 98% by weight of propionaldehyde and no more than 0.34% of acrolein the remainder being certain low boilers and some methylal. Without the use of the extractant substantially no separation may be obtained. The product removed from the base of the reboiler of the column comprises a mixture of acrolein and furfural which may be fractioned in the usual manner. The stripped furfural may then be recycled to the fractionating column wherein the propionaldehyde-acrolein mixture is being fractionated. Thus, our novel process enables propionaldehyde of excellent purity to be obtained efficiently and economically from mixtures of propionaldehyde and acrolein, and in a continuous manner.

It is to be understood that the foregoing detailed description is given merely by way of illustration and that many variations may be made therein without departing from the spirit of our invention.

Having described our invention, what we desire to secure by Letters Patent is:

1. In a process for the separation of propionaldehyde in purified form from a mixture comprising essentially propionaldehyde and acrolein, the step which comprises subjecting the mixture to fractional distillation under reflux while introducing furfural into the vapor stream where said vapor stream is substantially in equilibrium with a liquid phase in the distillation zone.

2. In a process for the separation of propionaldehyde in purified form from a mixture comprising essentially propionaldehyde and acrolein, the step which comprises subjecting the mixture to fractional distillation under reflux while introducing furfural into the vapor stream below the reflux feed inlet stream.

3. In a process for the separation of propionaldehyde in purified form from a mixture comprising essentially propionaldehyde and acrolein, the steps which comprises subjecting the mixture to fractional distillation under a reflux ratio of about 5:1 while introducing furfural into the vapor stream where said vapor stream is substantially in equilibrium with a liquid phase in the distillation zone.

4. In a process for the separation of propionaldehyde in purified form from a mixture comprising essentially propionaldehyde and acrolein, the step which comprises subjecting the mixture to fractional distillation under a reflux ratio of about 5:1 while introducing furfural into the vapor stream below the reflux feed inlet stream.

ADIN LEE STAUTZENBERGER.
SAMUEL B. JEFFRIES.

REFERENCES CITED

The following references are of record in the file of this patent:

UNITED STATES PATENTS

| Number | Name | Date |
|---|---|---|
| 2,281,243 | Lansing | Apr. 28, 1942 |
| 2,290,636 | Deanesly | July 21, 1942 |
| 2,339,576 | Luten | Jan. 18, 1944 |
| 2,350,256 | Shiras et al. | May 30, 1944 |
| 2,360,859 | Evans et al. | Oct. 24, 1944 |
| 2,360,861 | Pierotti et al. | Oct. 24, 1944 |

OTHER REFERENCES

Transaction of the American Institute of Chemicals Engineers, vol. 41, pages 353, 354, 355, 356, 357, 365 (June 25 1945), Copy in Scientific Library.